United States Patent
Hsieh (10) Patent No.: US 11,952,318 B2
(45) Date of Patent: Apr. 9, 2024

(54) METHOD FOR MANUFACTURING CERAMIC COMPOSITE MATERIAL AND PRODUCT THEREOF

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 636 days.

(21) Appl. No.: 17/031,894

(22) Filed: Sep. 25, 2020

(65) Prior Publication Data

US 2021/0171411 A1    Jun. 10, 2021

(30) Foreign Application Priority Data

Dec. 10, 2019  (TW) .................................. 108145049
Dec. 10, 2019  (TW) .................................. 108216371

(51) Int. Cl.
  *C04B 41/51*   (2006.01)
  *B62M 3/08*    (2006.01)
  *C04B 35/565*  (2006.01)
  *C04B 35/628*  (2006.01)
  *C04B 35/645*  (2006.01)
  *C04B 41/00*   (2006.01)
  *C04B 41/88*   (2006.01)

(52) U.S. Cl.
  CPC ........... *C04B 41/5155* (2013.01); *B62M 3/08* (2013.01); *C04B 35/565* (2013.01); *C04B 35/628* (2013.01); *C04B 35/645* (2013.01); *C04B 41/009* (2013.01); *C04B 41/88* (2013.01); *C04B 2235/3826* (2013.01); *C04B 2235/65* (2013.01)

(58) Field of Classification Search
  None
  See application file for complete search history.

(56) References Cited

U.S. PATENT DOCUMENTS

| | | | | |
|---|---|---|---|---|
| 5,196,271 A | * | 3/1993 | White ....................... | B28B 1/00 428/545 |
| 5,280,819 A | * | 1/1994 | Newkirk ............. | C04B 41/5155 164/109 |
| 5,420,085 A | * | 5/1995 | Newkirk .................. | C04B 35/10 501/98.4 |
| 5,526,867 A | * | 6/1996 | Keck ...................... | C22C 1/1015 174/547 |
| 2016/0023951 A1 | * | 1/2016 | Alessi ................... | C04B 28/005 425/352 |

* cited by examiner

*Primary Examiner* — John J Figueroa
(74) *Attorney, Agent, or Firm* — Chun-Ming Shih; LANWAY IPR SERVICES (57) ABSTRACT

The method includes the steps of: a) selecting particles with particular slenderness ratios and diameters from SiC powder to serve as selected SiC material powder; b) coating a PVA coating on particles of the selected SiC material powder so that the PVA coating and the selected SiC material powder are combined into a particulate ceramic material; c) pressing the particulate ceramic material into a ceramic base body; d) sintering the ceramic base body to form a fixed shape and forming completely continuous channels from an inside to a surface thereof by cooling; and e) infiltrating the ceramic base body with molten aluminum. The ceramic composite material made by the method includes a ceramic base body having completely continuous channels from an inside to a surface thereof; an aluminum filler filled in the channels; and an aluminum coating disposed on the ceramic base body and integratedly connecting with the aluminum filler.

6 Claims, 7 Drawing Sheets

METHOD FOR MANUFACTURING CERAMIC COMPOSITE MATERIAL AND PRODUCT THEREOF

TECHNICAL FIELD

The invention relates to a method for manufacturing a ceramic composite material and a product thereof, particularly to a ceramic composite material which has light weight, high thermal conduction, high rigidity, high toughness and low expansion coefficient.

RELATED ART

Porous silicon carbide (SiC) ceramic has excellent strength at high temperature, chemical stability, thermal shock resistance and oxidation resistance, so it has been widely applied. SiC material is crystalline powder and belongs to nonmetallic material. There is no free electron in the crystalline structure, so the insulation is great. Thermal conduction of SiC is of the phonon conduction mechanism. When lattices are complete, the larger the mean free path of phonons is, the higher the thermal conductivity is. SiC ceramic heatsinks are resistant to cold and hot shocks, are not easily affected by ambient temperature, have high porosity and a radiative heat dissipation mechanism, and have superior heat dissipation performance. For example, ceramic heatsinks are made by the continuous porous ceramic manufacturing process and have light and thin volume and excellent heat dissipation performance.

Generally speaking, performances of porous ceramic depend on not only the material itself but also the micro structure of ceramic. The pore structure of the porous ceramic, such as pore diameter, pore distribution and pore directionality, are controlled by the manufacturing process. Thus, performances of porous SiC ceramic are significantly affected by the manufacturing process. Usually, the manufacturing process of porous SiC ceramic includes steps of mixing, forming and sintering. A conventional method for manufacturing porous ceramic adds a pore former (organic matter) in a ceramic material, supports the ceramic material in a high-pressure forming process and eliminates the organic matter in a sintering process. The eliminated portions form pores in the ceramic body.

China patent No. 104072190B teaches several methods for manufacturing porous SiC ceramic, which include the adding foam approach, the organic foam impregnation approach and the sol-gel approach. Porous ceramic made by these approaches cannot possess both high porosity and high strength (for example, the porous SiC ceramic made by the organic foam impregnation approach can reach a porosity of 70%-80%, but its strength is below 10 MPa). Also, shapes of the pores are not easy to be controlled and the specific surface area is too low.

To solve these problems, China patent No. 104072190B uses, in quality percentage, 2.5%~8.8% $Al_2O_3$ as a burning aid, 55%~80% nanometer SiC micropowder as a base material, 10%~35% PMMA (polymethylmethacrylate) micropowder as a pore former, and 1.2%~7.5% phenolic resin as an adhesive. The burning aid, the base material and the adhesive are mixed in ball mill for 8~12 hours. The mixed powder material and the pore former are mixed in a mixed for 10-30 minutes and then perform pressing and forming.

China patent No. 1187291C uses yeast to serve as a pore former. Materials are mixed into slurry. Yeast is divided into six particle size gradients to mix with the slurry and to be dried into dry powder. The dry powder is pressed and formed at pressure of 20'100 MPa and then sinter at 1100~1350° C. and keep warm for 1~1.5 hours. Finally, porous SiC ceramic with different pore sizes is obtained.

China patent No. 106588085A uses deionized water to mix flour and yeast evenly and knead into dough. The dough is fermented and then frozen and dried to become porous dough. The porous dough is carbonized to obtain a porous carbon skeleton. The porous carbon is put on a reactive silicon source to be sintered and then cooled to obtain a porous SiC ceramic with high temperature resistance.

China patent No. 104193395B controls the ratio of graphite, metallic silicon powder and organic adhesive to make the product be SiC. In addition, by controlling the ratio of the three matters, the porosity of porous SiC ceramic can be accurately controlled. The porosity is controllable between 40% and 80%.

The mixing step of a current method for manufacturing a porous SiC ceramic material is to mix SiC powder and other required materials (such as an adhesive and a pore former) into a ceramic material. It may be called granulation. The granulation may be divided into a dry type and a wet type. The wet type is more common and needs water and a large amount of solvent or adhesive, so a drying process is required after the granulation. The dry type does not need water or solvent. Only an adhesive is needed. Thus its humidity is lower than the wet type and its drying time is shorter than the wet type. The dry type granulation needs accurate parameters and properties of materials, but it does not use harmful matters and can save the drying time. The dry type also can control the porosity and the pore size.

Another conventional method for manufacturing a ceramic composite material is the gravity casting infiltration method. This method heats ceramic sheets to about 1000° C., put the ceramic sheets in a mold and fill molten aluminum into the mold. This method has uncertainty, so it has bad manufacturing stability and yield rate.

SUMMARY OF THE INVENTION

An object of the invention is to provide a method for manufacturing a ceramic composite material, which can improve the manufacturing stability and the yield rate.

To accomplish the above object, the method for manufacturing a ceramic composite material of the invention includes the steps of:

a) selecting particles with a slenderness ratio between 1:1.075 and 1:1.09 and a diameter between 3 μm and 15 μm from silicon carbide (SiC) powder to serve as selected SiC material powder;

b) mixing the selected SiC material powder with polyvinyl alcohol (PVA), wherein the selected SiC material powder is stirred to be flown up, the PVA is evenly sprayed to combine with the selected SiC material powder, each particle of the SiC powder is covered by a PVA coating, the PVA coating and the SiC powder particles are combined into a particulate ceramic material, and the PVA coating accounts for 0.1%-0.8% w/w (weight by weight) of the particulate ceramic material;

c) pressing the particulate ceramic material into a ceramic base body and letting the ceramic base body sit for 24 hours;

d) sintering the ceramic base body to form a fixed shape after step c) and forming completely continuous channels from an inside to a surface thereof by cooling; and e) infiltrating the ceramic base body with molten aluminum.

In the method of the invention, the SiC powder is divided into multiple grades according to particle size, and one grade of the SiC powder is selected to serve as the selected SiC material powder.

In the method of the invention, the grades are ten in number.

In the method of the invention, pressure in the step c) is 300-1500 kg/cm².

In the method of the invention, the step d sinters the ceramic base body between 1050° C. and 1450° C. according to a predetermined temperature control process, the ceramic base body is heating up to a predetermines sintering temperature between 1050° C. and 1450° C.

In the method of the invention, the ceramic base body is heating up for 8-12 hours to the predetermines sintering temperature, the predetermines sintering temperature is kept for 2-8 hours, and finally, the sintered ceramic base body is cooled for 6-8 hours to a normal temperature.

In the method of the invention, in step e), the ceramic base body is put in a mold and then heat up the mold to a constant temperature between 200° C. and 600° C.

DETAILED DESCRIPTION OF THE INVENTION

Figure 1:
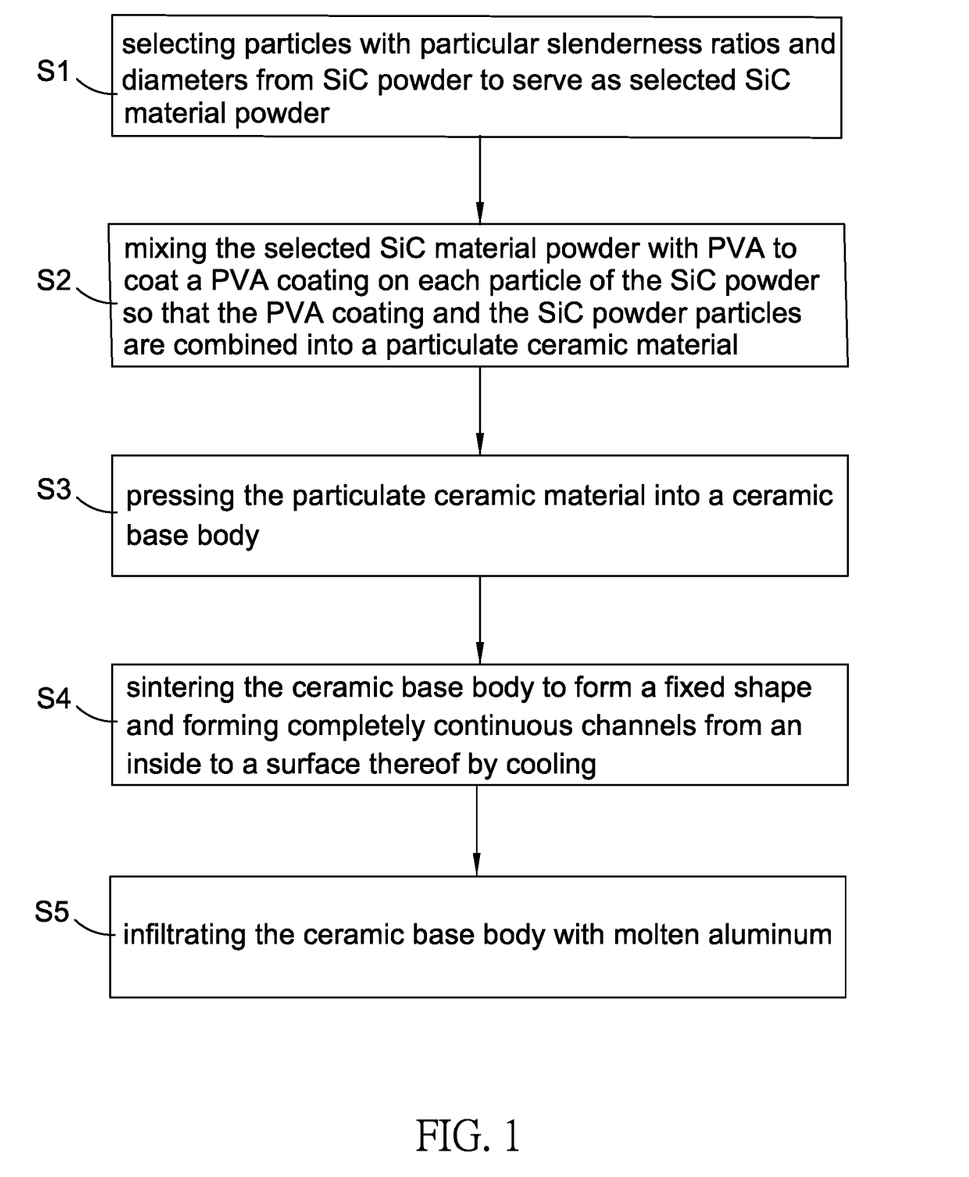
FIG. 1 is a flowchart of the method of the invention.

Please refer to FIG. 1. The method for manufacturing a ceramic composite material of the invention includes the following steps:
S1) selecting particles with a slenderness ratio between 1:1.075 and 1:1.09 and a diameter between 3 μm and 15 μm from silicon carbide (SiC) powder 11 to serve as selected SiC material powder;
S2) mixing the selected SiC material powder with polyvinyl alcohol (PVA) to coat a PVA coating 12 on each particle of the SiC powder 11, wherein the PVA coating and the SiC powder particles are combined into a particulate ceramic material 10, and preferably, the PVA coating accounts for 0.1%-0.8% w/w (weight by weight) of the particulate ceramic material 10;
S3) pressing the particulate ceramic material 10 into a ceramic base body 30;
S4) sintering the ceramic base body 30 to form a fixed shape and forming completely continuous channels from an inside to a surface thereof by cooling; and
S5) infiltrating the ceramic base body 30 with molten aluminum, wherein the ceramic base body 30 is put in a mold with a preset thickness and then heat up the mold to a constant temperature and make molten aluminum infiltrate the ceramic base body 30 with high pressure and high speed to be casted. Thus a ceramic composite material A is obtained.

In step S1, the SiC powder 11 is divided into several grades according to particle size, and one grade of the SiC powder 11 is selected to serve as the selected SiC material powder. Preferably, the grades are ten in number. Thus, the porosity, density and specific surface can be easily adjusted by the grading.

The step S2 can be deemed as a dry type granulation approach. It is called "Diffusive high-speed granulation process". Continuous pores can be formed in the particulate ceramic material 10 without a pore former. Therefore, no toxic organics will be emitted during sintering, and since there are no impurities during sintering, there is no need to extend the sintering time to discharge organics.

Figure 2:
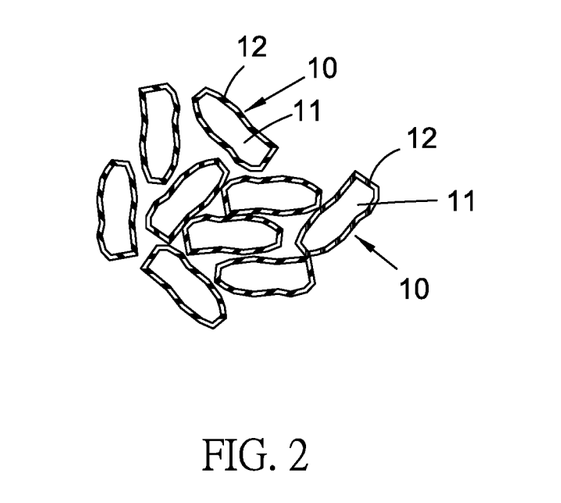
FIG. 2 is a schematic view of the particulate ceramic material made by step S2 of the method of the invention.

In the diffusive high-speed granulation process, preferably, the selected SiC material powder is high-speed stirred with diffusive blades to be flown up, the PVA is evenly sprayed to combine with the selected SiC material powder to form the particulate ceramic material 10. In other words, the SiC powder 11 is flown up and combines with sprayed liquid PVA to form the particulate ceramic material 10. The PVA covering the SiC powder 11 to form the PVA coating 12. Normally, particles of the SiC powder 11 can be adhered with each other by PVA to form irregularly spherical particulate ceramic material 10 as shown in FIG. 2. The time consuming in the granulation step is very short and a very small amount of PVA is needed, so wearing of the SiC powder 11 in the granulation step can be effectively reduced to avoid the slenderness ratio of the SiC powder 11 is varied. On the other hand, the PVA coating 12 may increase the porosity in the subsequent step.

Figure 3:
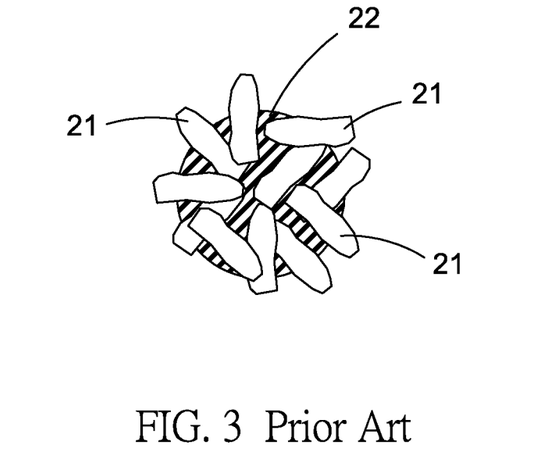
FIG. 3 is a schematic view of the ceramic material made by a conventional wet type granulation approach.

In comparison with the wet type granulation approach which adds PVA as an adhesive and stirs SiC powder and PVA in a container. Stirring easily causes clumps. The conventional dry type granulation approach needs more PVA (about 3.0% w/w). As shown in FIG. 3, many SiC powder particles 21 are adhered to a PVA clump 22 to form a particulate ceramic powder material. The shape of this particulate ceramic powder material is approximately spherical, so it has better mobility to be hard to form pores. The differences between the granulation step and the conventional wet type granulation approach are listed as follows:

a) The invention keeps the shapes of particles of the SiC powder 11 complete to avoid the slenderness ratio of the SiC powder 11 from varying.

b) The particulate ceramic material 10 made by step S2 keeps pores to improve porosity of the ceramic base body 30.

c) The conventional wet type granulation approach needs a PVA adhesive over 3.0 wt %. The PVA accounts for below 0.8 wt % of the particulate ceramic material 10.

d) The conventional wet type granulation approach needs a large amount of organic solvents, so it harmful to environment protection.

The particulate ceramic material 10 made by step S2 can form pores by mechanical bridging. A continuous pore structure can be formed in the ceramic base body 30. This can solve the problem of discontinuous pores made by a pore former or foam. Also, the porosity of the ceramic base body 30, the structural strength and the specific surface area.

Step S3 presses the particulate ceramic material 10 into the ceramic base body 30 with proper pressure according to actual requirements. Preferable pressure is 300-1500 kg/cm$^2$. In this step, the mold will be adjusted in time to make pressure evenly distributed in the ceramic base body 30. After the particulate ceramic material is pressed into a ceramic base body 30, let the ceramic base body 30 sit for 24 hours to completely release stress. Thus, the ceramic base body 30 has even density distribution and great structural strength.

Figure 4:
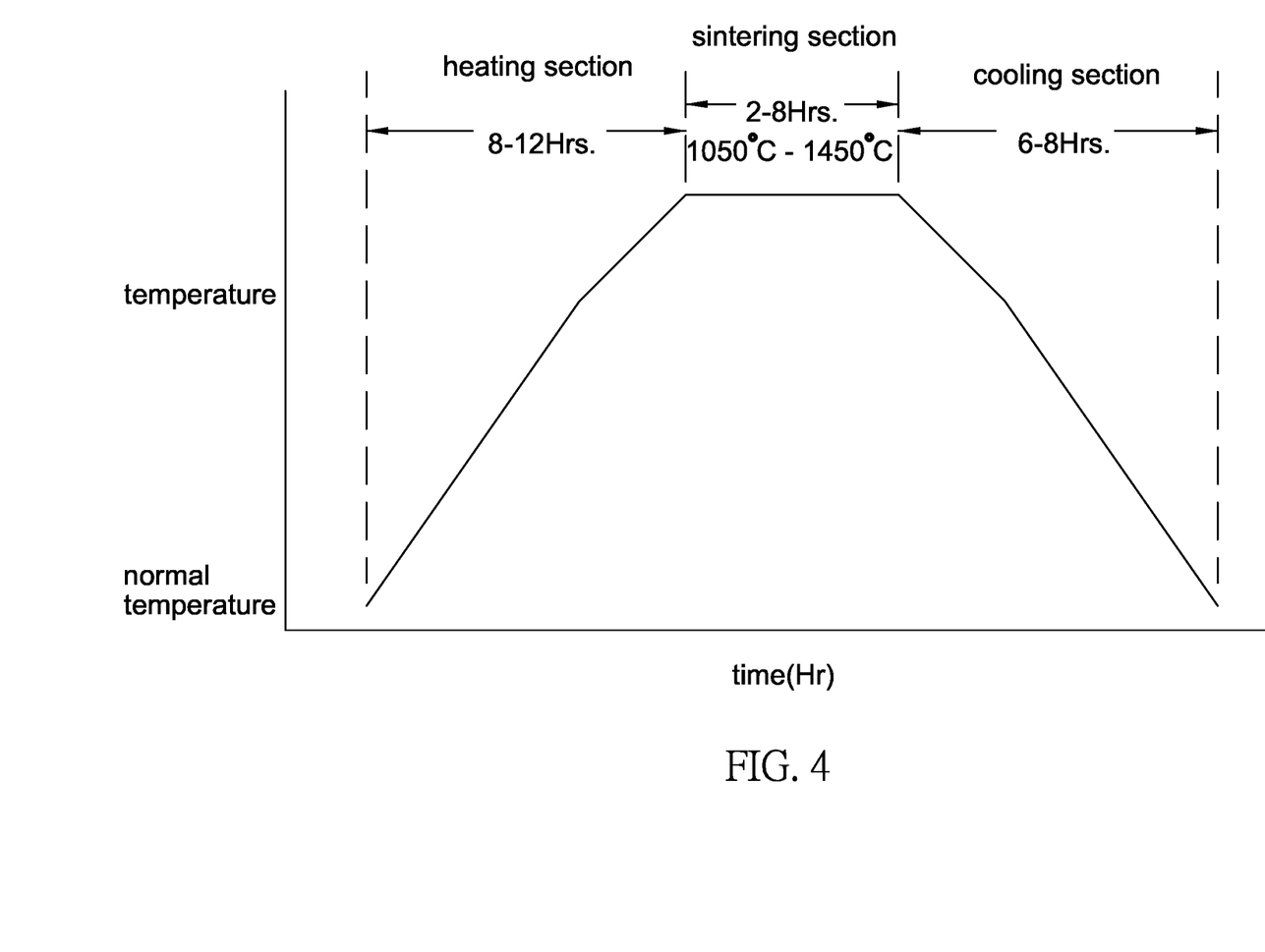
FIG. 4 is a schematic view of temperature control in step S4 of the method of the invention.

Step S4 sinters the ceramic base body 30 between 1050° C. and 1450° C. according to a predetermined temperature control process (such as heating-keeping-cooling). A preferred embodiment of the temperature control process is shown in FIG. 4. In the heating section, the ceramic base body 30 is heating up for 8-12 hours to a predetermines sintering temperature between 1050° C. and 1450° C. (depending on the grading of the particulate ceramic material 10. In the sintering section, keep the sintering temperature to sinter for 2-8 hours. Finally, in the cooling section, the sintered ceramic base body 30 is cooled for 6-8 hours to a normal temperature.

In step S5, the mold is heated between 200° C. and 600° C.

Figure 5:
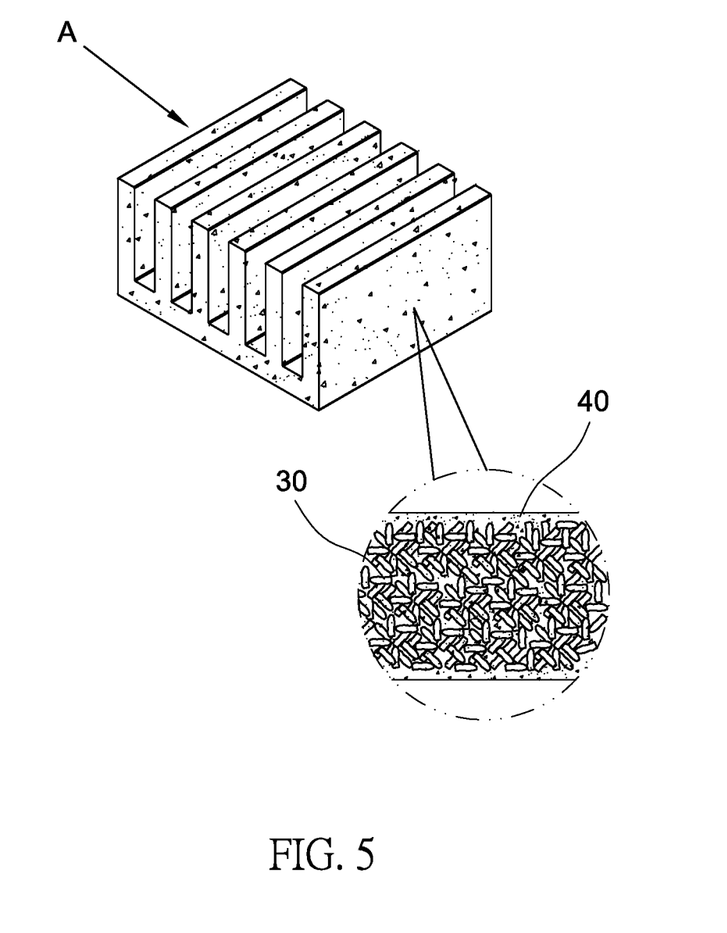
FIG. 5 is a schematic view of the first embodiment of the ceramic composite material made by the method of the invention.

A ceramic composite material A made by the above method, as shown in FIG. 5, includes a ceramic base body 30 having completely continuous channels from an inside to a surface thereof, an aluminum filler filled in the channels and an aluminum coating 40 disposed on the ceramic base body 30 and integratedly connecting with the aluminum filler.

Figure 6:
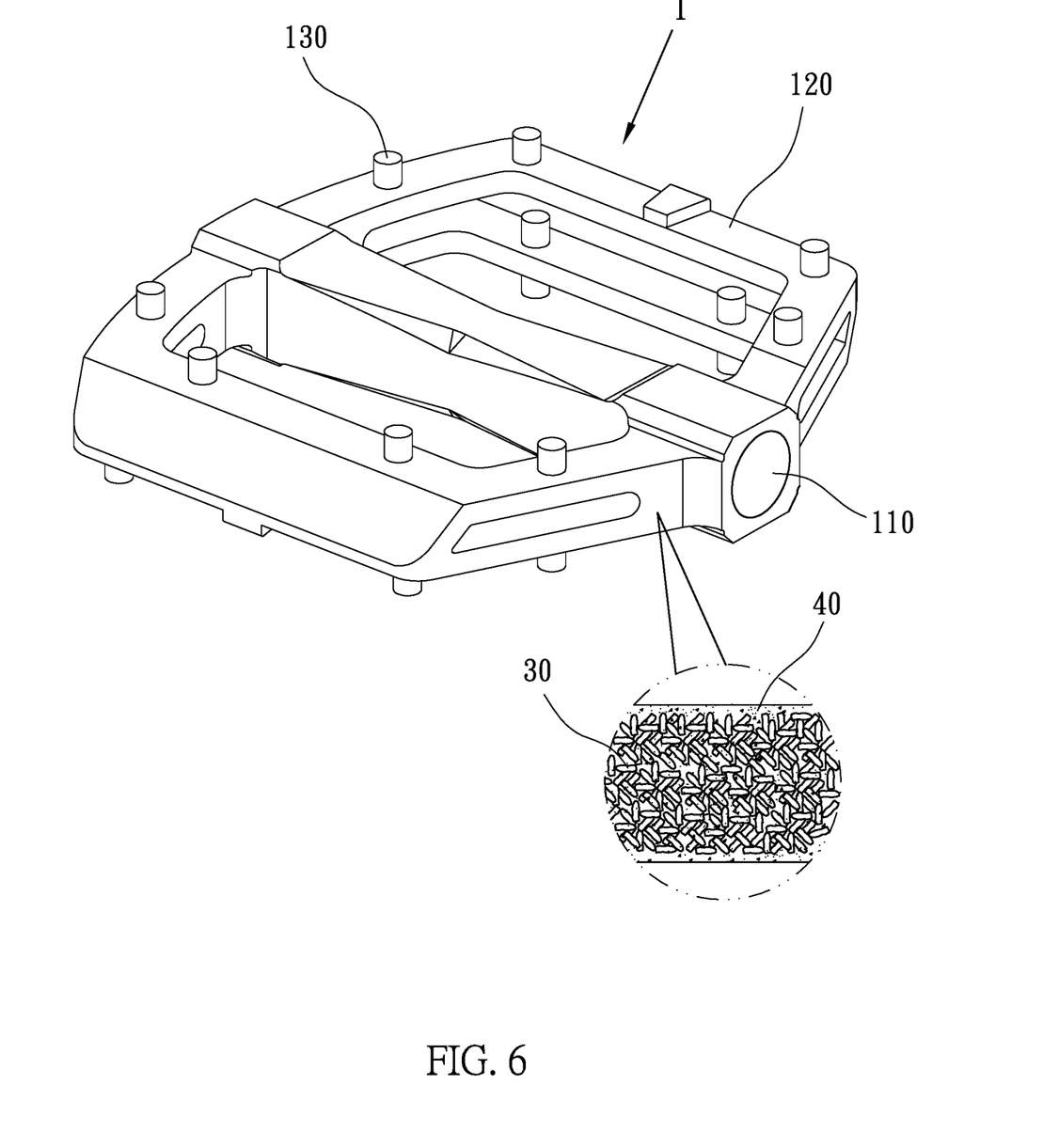
FIG. 6 is a schematic view of the second embodiment of the ceramic composite material made by the method of the invention.
Figure 7:
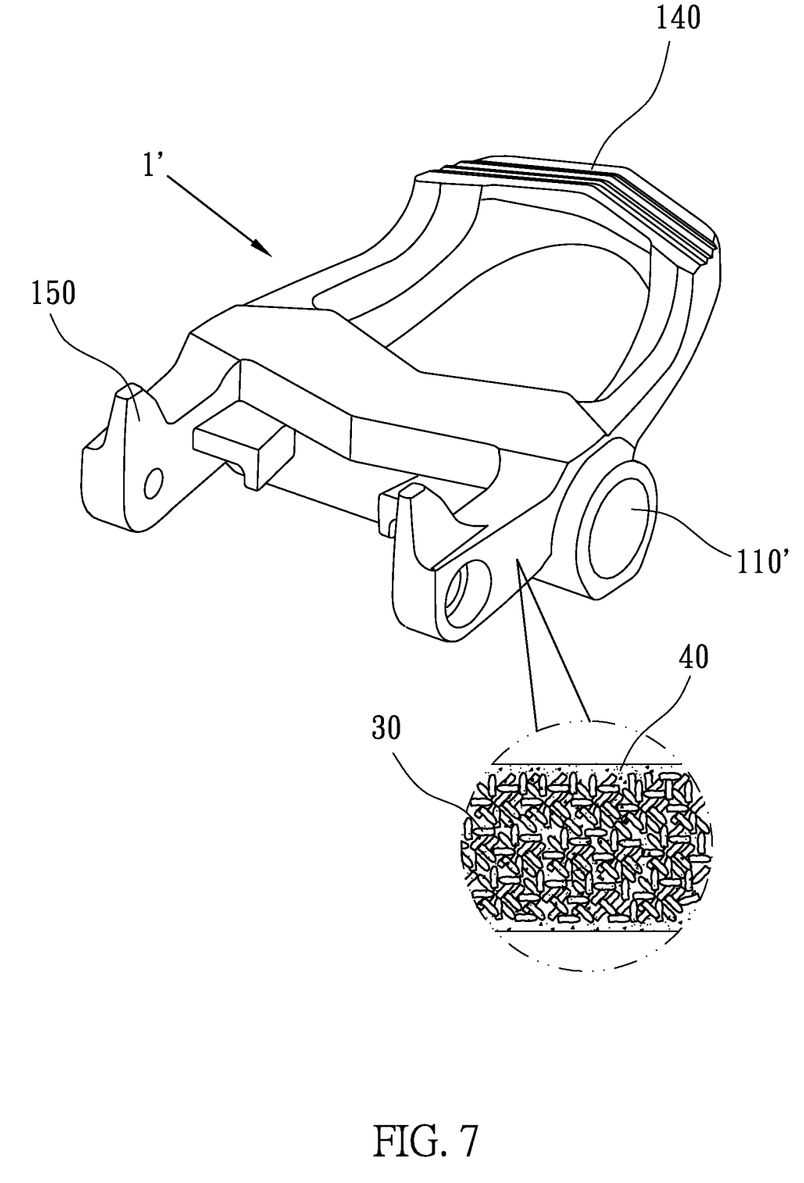
FIG. 7 is a schematic view of the third embodiment of the ceramic composite material made by the method of the invention.
Figure 8:
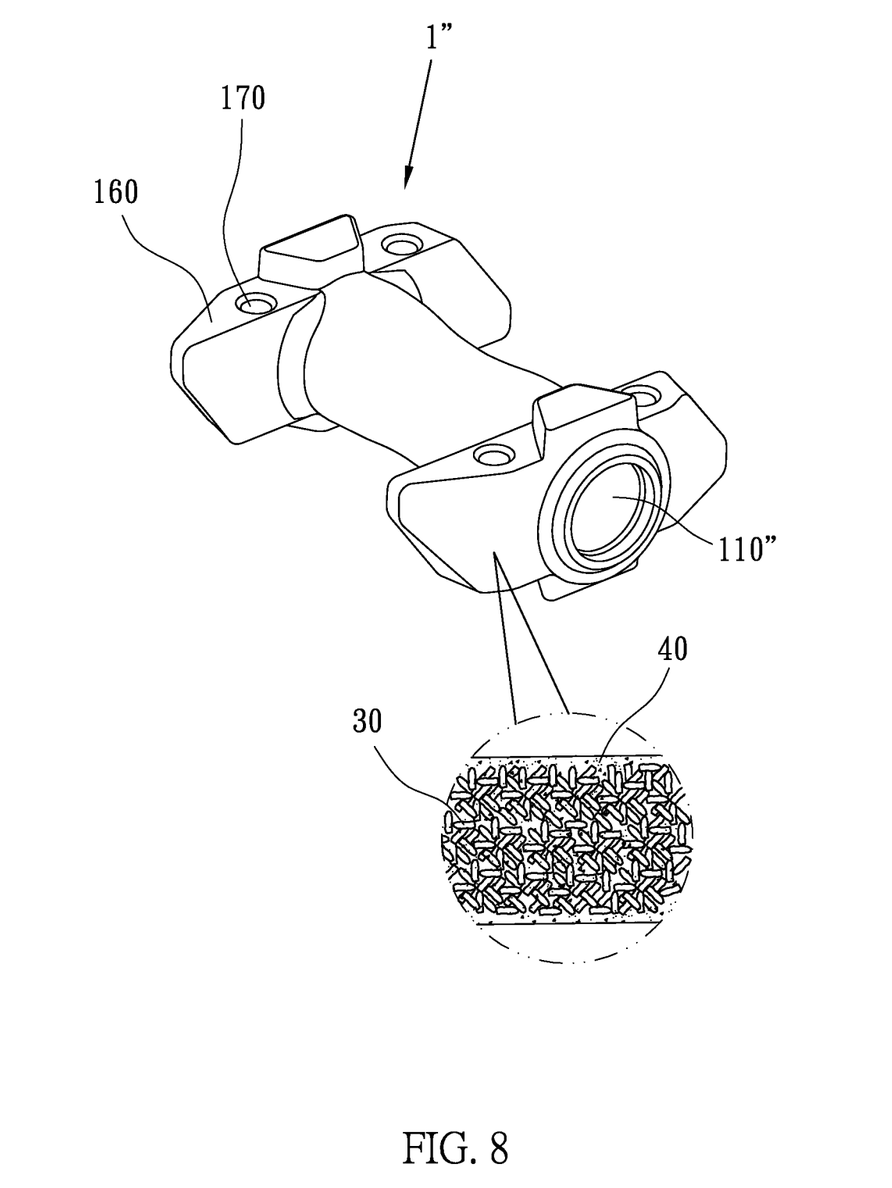
FIG. 8 is a schematic view of the fourth embodiment of the ceramic composite material made by the method of the invention.

FIG. 6 shows a BMX pedal using the ceramic composite material A of the invention. The pedal body 1 adopts the ceramic composite material A formed by a ceramic base body 30 infiltrated with aluminum and an aluminum coating 40. The pedal body 1 includes a shaft hole 110 and a pedal frame 120. The pedal frame 120 is formed with studs 130. FIG. 7 shows a clipless pedal for a road bike. The pedal body 1' includes a shaft hole 110' and a pedal frame with a front hook 14 and a rear hook 15. FIG. 8 shows a pedal for a mountain bike. The pedal body 1" includes a shaft hole 110" and a pedal frame with four protrusions 16 and four holes 17.

Aluminum infiltrates and coats the ceramic base body 30 to improve structural strength and protect the ceramic base body 30.

It will be appreciated by persons skilled in the art that the above embodiments have been described by way of example only and not in any limitative sense, and that various alterations and modifications are possible without departure from the scope of the invention as defined by the appended claims.

What is claimed is:

1. A ceramic composite material comprising: a ceramic base body having completely continuous channels from an inside to a surface thereof; an aluminum filler filled in the channels; and an aluminum coating disposed on the ceramic base body and integratedly connecting with the aluminum filler,
wherein the ceramic composite material is formed into a bicycle pedal, and
wherein a pedal body of the bicycle pedal comprises a shaft hole and a pedal frame.

2. The ceramic composite material of claim 1, wherein the pedal frame is formed with a stud.

3. The ceramic composite material of claim 1, wherein the pedal body comprises a shaft hole and a pedal frame with a front hook and a rear hook.

4. The ceramic composite material of claim 1, wherein the pedal body includes a shaft hole and a pedal frame with four protrusions.

5. The ceramic composite material of claim 4, wherein each protrusion is formed with a hole.

6. The ceramic composite material of claim 1, wherein a thickness of the aluminum coating of the bicycle pedal is between 0.3 mm and 0.7 mm.

* * * * *